United States Patent
Yilma et al.

(10) Patent No.: US 11,368,409 B2
(45) Date of Patent: Jun. 21, 2022

(54) METHOD FOR CUSTOMIZED, SITUATION-AWARE ORCHESTRATION OF DECENTRALIZED NETWORK RESOURCES

(71) Applicant: NEC Laboratories Europe GmbH, Heidelberg (DE)

(72) Inventors: Girma Mamuye Yilma, Heidelberg (DE); Faqir Zarrar Yousaf, Leimen (DE); Marco Liebsch, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 36 days.

(21) Appl. No.: 16/935,227

(22) Filed: Jul. 22, 2020

(65) Prior Publication Data
US 2022/0029930 A1 Jan. 27, 2022

(51) Int. Cl.
*H04L 12/911* (2013.01)
*H04W 24/08* (2009.01)
(Continued)

(52) U.S. Cl.
CPC .......... *H04L 47/78* (2013.01); *G06F 9/45558* (2013.01); *H04L 41/12* (2013.01);
(Continued)

(58) Field of Classification Search
CPC ......... H04L 41/12; H04L 41/24; H04L 47/78; H04L 43/04; H04L 43/0811;
(Continued)

(56) References Cited

U.S. PATENT DOCUMENTS

2012/0222004 A1 8/2012 Labat et al.
2015/0019954 A1 1/2015 Dalal et al.
(Continued)

FOREIGN PATENT DOCUMENTS

WO WO-2016022698 A1 * 2/2016 ............. H04L 41/08
WO WO 2017/032280 A1 3/2017

OTHER PUBLICATIONS

Yousaf, Faqir Zarrar et al. "MANOaaS: A Multi-Tenant NFV MANO for 5G Network Slices," in IEEE Communications Magazine, vol. 57, No. 5, pp. 103-109, May 2019.
(Continued)

*Primary Examiner* — Kostas J Katsikis
(74) *Attorney, Agent, or Firm* — Leydig, Voit & Mayer, Ltd.

(57) ABSTRACT

A method for performing network function virtualization (NFV) management and orchestration (MANO) operations in a telecommunications network includes collecting, by a mobile network node, mobile network node condition data that specifies network conditions present at the mobile network node, providing, to a distributed NFV-MANO system component located at the mobile network node, the mobile network node condition data, and executing, by the distributed NFV-MANO system component, MANO decision logic. The MANO decision logic provides, based on input that includes at least the mobile network node condition data, at least one MANO operation decision as output. The telecommunications network includes stationary infrastructure components and mobile infrastructure components that communicate with stationary infrastructure components via wireless links, and the mobile network node is one of the mobile infrastructure components of the telecommunications network.

20 Claims, 6 Drawing Sheets

(51) Int. Cl.
   *H04L 12/24* (2006.01)
   *G06F 9/455* (2018.01)
   *H04L 47/78* (2022.01)
   *H04L 41/12* (2022.01)
   *H04L 41/00* (2022.01)

(52) U.S. Cl.
   CPC ............. *H04L 41/24* (2013.01); *H04W 24/08* (2013.01); *G06F 2009/45591* (2013.01)

(58) Field of Classification Search
   CPC . H04L 43/0817; H04L 43/0876; H04L 43/06; H04L 43/062; H04L 43/065; H04L 43/0882; H04L 43/0888; H04L 43/0894; H04W 24/08; G06F 9/45558; G06F 2009/45591
   See application file for complete search history.

(56) References Cited

U.S. PATENT DOCUMENTS

| | | | |
|---|---|---|---|
| 2016/0156513 A1 | 6/2016 | Zhang et al. | |
| 2016/0381150 A1* | 12/2016 | Rajagopal | G06F 9/45558 709/223 |
| 2017/0150399 A1* | 5/2017 | Kedalagudde | H04W 72/04 |
| 2018/0077080 A1* | 3/2018 | Gazier | H04L 43/0817 |
| 2018/0295067 A1* | 10/2018 | Xia | H04L 47/781 |
| 2019/0028943 A1* | 1/2019 | Wang | H04W 8/065 |
| 2019/0065234 A1* | 2/2019 | Zembutsu | H04L 47/82 |
| 2019/0090311 A1* | 3/2019 | Takashima | H04W 88/18 |
| 2020/0186446 A1* | 6/2020 | Yousaf | H04L 41/5054 |
| 2020/0374755 A1* | 11/2020 | Montenot | H04W 28/20 |
| 2020/0383041 A1* | 12/2020 | Yoshikawa | G06F 9/45558 |
| 2021/0240511 A1* | 8/2021 | Manas | G06F 9/5016 |

OTHER PUBLICATIONS

Fattore et al. "UPFlight: An enabler for Avionic MEC in a drone-extended 5G mobile network", VTC 2020, May 2020.
Nogales, Borja et al. "Adaptable and Automated Small UAV Deployments via Virtualization," Sensors 2018, 18, 4116, Nov. 23, 2018.
Selvi, K. Tamil and R.Thamilselvan, "Software Defined Networking and Network Function Virtualization for Service Providers using Network Slice AS a Service," IJEAT, Dec. 15, 2019.
Ciena, Blue Planet "NFV Orchestration," Nov. 1, 2018.
Nogales, Borja et al. "A NFV System to support configurable and automated multi-UAV service deployments," ACM, DroNet'18, Jun. 10-15, 2018, Munich, Germany.
Telefonaktiebolaget LM Ericsson, "Orchestration," Dec. 3, 2019.
Alt, Rainer et al. "Smart Services: The Move to Customer Orientation," Institute of Applied Informatics at University of Leipzig, Electronic Markets (2019) 29:1-6, Feb. 23, 2019.
Cui, Binge, "An Approach to Aggregating Web Services for End-User-Doable Construction of GridDoc Application," Distributed Computing and Internet Technology, 4th International Conference, ICDCIT, Bangalore, India, Dec. 2007 Proceedings, pp. 271-276.
Bonfim, Michel S. et al. "Integrated NFV/SDN Architectures: A Systematic Literature Review," ACM, arXiv:1801.01516v1, Jan. 4, 2018.
"Open Baton: An extensible and customizable NFV MANO-compliant framework," May 23, 2020.
Montariolo, Enrico, "Organization Transformation for Network Function Virtualization Infrastructure As A Service (NFVIaaS)," VMware Professional Services, Nov. 2015.
Kouchaksaraei, Hadi Razzaghi et al. "Programmable and Flexible Management and Orchestration of Virtualized Network Functions," IEEE, Jun. 2018.

* cited by examiner

METHOD FOR CUSTOMIZED, SITUATION-AWARE ORCHESTRATION OF DECENTRALIZED NETWORK RESOURCES

FIELD

The present invention relates to systems and methods for network function virtualization management and orchestration, and in particular, to systems and methods for customized, situation aware management and orchestration of network resources utilized for network function virtualization.

BACKGROUND

Network Function Virtualization (NFV) technology enables the virtualization of network node functions that have historically been carried out by customized hardware components. NFV technology decouples the software implementations of network node functions from the underlying hardware infrastructure by leveraging virtualization technology. In particular, NFV technology virtualizes application functions and network functions and packages them in VMs or containers (or a combination thereof). Such virtualized application functions and network functions are commonly referred to as Virtual Application Functions (VAFs) and Virtual Network Functions (VNFs) depending on their respective role. Multiple VNFs can be combined and linked to each other via Virtual Links (VLs) thereby forming well-defined topologies specified by VNF Forwarding Graphs (VNFFGs). Such linked combinations of VNFs are able to deliver complex Network Services (NSs).

VAFs and VNFs, which can collectively be referred to as Virtualized Functions (VFs), are deployed in an NFV Infrastructure (NFVI). The NFVI, which can span multiple physical locations, includes all of the various hardware and software components that collectively constitute the environment in which the VFs are deployed. Such hardware and software components offer virtualized resources, e.g. compute resources, network resources, and memory/storage resources.

Virtualized NSs provide tremendous advantages but also entail significant management challenges. In order to meet such challenges, management systems commonly referred to as Management and Orchestration (MANO) systems, have been proposed. In this regard European Telecommunications Standards Institute (ETSI) Industry Specification Group (ISG) NFV has proposed a standard NFV-MANO system, which is illustrated in FIG. 1. The standard NFV-MANO system goes beyond the traditional fault, configuration, accounting, performance, and security (FCAPS) management by additionally providing Lifecycle Management (LCM) of the virtualized resources, VFs, VLs, and NS instances in an NFVI. The LCM actions include, e.g., scaling (up/down/in/out), migration, instantiation, deletion, updating, upgrading, configuration, VF package management, and operations on VF/NS instances in an NFVI.

Current approaches envisage a centralized deployment of an NFV-MANO system in a data center. However, such approaches have inherent performance issues and management challenges—as presented in [3]. On the other hand, 5G-Crosshaul [6] and 5G-Transformer [7] have proposed fully-fledged, per tenant NFV-MANO systems designed to meet transport network challenges. A two-tier orchestration system has been introduced, which offloads the enforcement of orchestration decisions as well as some orchestration tasks to local controllers or orchestrators in a radio access network (RAN), network edge clouds, transport networks and central cloud networks. This may speed up the proper deployment and updates in NFV systems.

Open-source MANO system implementations have also been developed, of which the ETSI Open Source MANO (OSM) [5] and the Linux Foundation (LF)'s Open Network Automation Platform (ONAP) [4] are particularly notable. Such NFV-MANO systems contemplate a one-size-fits-all solution. For this reason, such NFV-MANO systems can be, in certain situations, overly complex and difficult to setup. The one-size-fits-all approach results in huge resource requirements for the deployment of such NFV-MANO systems. For example, ONAP installation requires over 80 vCPUs, 200 GBs of memory, and extensive deployment scripts and procedures. ONAP is therefore a complex system to install, operate, and manage, even for experienced professionals. Furthermore, setting up and operating ONAP in resource constrained edge data centers is not feasible.

For edge data centers, orchestration platforms such as Cloudify [1] and Akriano [2] have been developed as open-source projects to support low-latency provision of NSs to users. However, the design of such edge orchestration platforms still follows the one-size-fits-all approach referred to above.

SUMMARY

According to an embodiment, the present disclosure provides a method for performing network function virtualization (NFV) management and orchestration (MANO) operations in a telecommunications network. The telecommunications network includes stationary infrastructure components and mobile infrastructure components that communicate with stationary infrastructure components via wireless links. The method includes collecting, by a mobile network node, mobile network node condition data that specifies network conditions present at the mobile network node, providing, to a distributed NFV-MANO system component located at the mobile network node, the mobile network node condition data, and executing, by the distributed NFV-MANO system component, MANO decision logic. The MANO decision logic provides, based on input that includes at least the mobile network node condition data, at least one MANO operation decision as output. The mobile network node is one of the mobile infrastructure components of the telecommunications network that communicate with the stationary infrastructure components of the telecommunications network via the wireless links.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
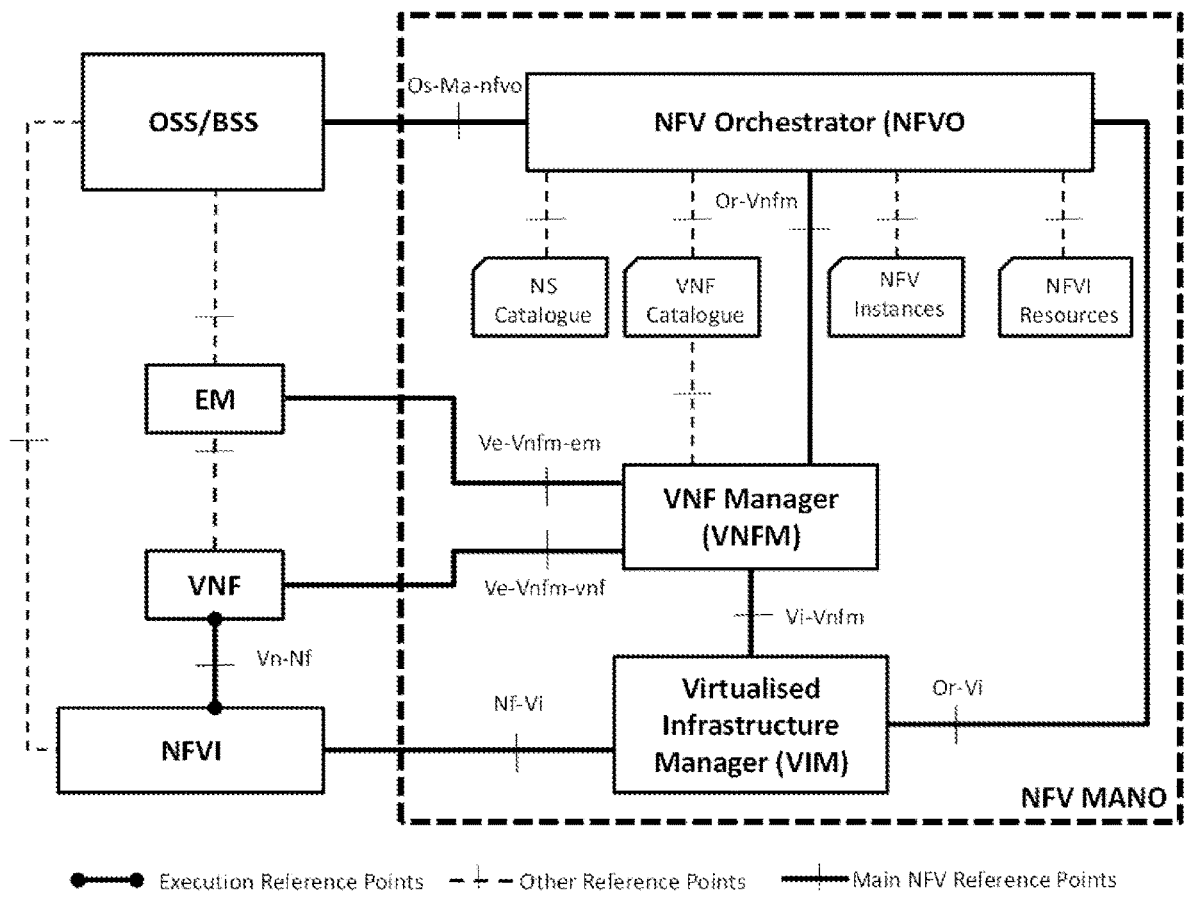
FIG. 1 illustrates the standard ETSI NFV-MANO architecture.

In the context of NFV-MANO systems, a one-size-fits-all solution may not be optimal. If available resources that need to be orchestrated are not statically bound to a network-topology and geo-position but can instead be placed in an on-demand fashion, improvements in the quality of network services provided to users can be realized. For example, if mobile edge resources can be provided in an on-demand fashion, such resources can be placed in a manner that is responsive to the service quality as experienced from the perspective of one or more users/verticals/tenants. Such mobile edge resources—realized, e.g., by an unmanned aerial vehicle or an autonomously driven vehicle with on-board compute, storage, and network resources—provide extensions to a fixed network and cloud infrastructure. Flexible placement and use of such mobile edge resources create new management and orchestration challenges that are best met by dynamic NFV-MANO solutions.

Current NFV-MANO solutions are resource aware but do not have the capability to collaborate with end users or client devices—such as user equipment (UE), machine-type devices, UAVs, or robots—to ease and optimize the MANO decision process. Furthermore, current NFV-MANO systems are based on topologically static resource configurations and are not able to properly account for variations in the amount of micro-resources (i.e. compute, network, and storage resources) at network edges, e.g., micro-resources provided by a drone or vehicle [8]. In addition, current NFV-MANO systems imply a constrained visibility of the environmental situation, monitoring data points, etc. for making orchestration decisions in the network. As a result, current NFV-MANO systems exhibit problems in making proper decisions regarding the placement and deployment of mobile resources (e.g. drones and vehicles with compute, storage, and network resources) for extending the capabilities of fixed network and cloud infrastructure. Current NFV-MANO systems also exhibit problems in provisioning of resources to resource-constrained environments (e.g. event or rescue spot), e.g. through re-placement/relocation of a placed resource. Moreover, the limited visibility implied by current NFV-MANO systems results in problems in placing and deploying network functions (radio base stations, 5G User Plane Function, 5G Uplink Classifier) and service functions and in re-placing/re-locating previously placed functions.

The present disclosure describes systems and methods that provide customized, situation-aware, user-driven NFV-MANO of decentralized network resources. Customized, situation-aware, user-driven NFV-MANO is a novel paradigm for building NFV-MANO systems in which end user devices become an integral part of the MANO decision-making process. Customized orchestration solutions can be built in an on-demand fashion from the combination of a standard base NFV-MANO system and a set of tailored NFV-MANO components capable of providing customized MANO functionality.

The customized, situation-aware, user-driven NFV-MANO described herein can provide a superior alternative to the one-size-fits-all solutions of the prior art—particularly for resource-constrained and variant environments (such as mobile edge cloud systems)—because, unlike one-size-fits-all solutions, the solutions described herein enable MANO components tailored for particular operations and also enable deployment of MANO components at collaborating end user devices. The customized, situation-aware, user-driven NFV-MANO described herein thereby enables end user client devices to become directly involved in the orchestration of network resources and functions. By leveraging such clients' superior view of the network environment (as compared to the view of the network environment provided by the network infrastructure), such as client-experienced network performance and visibility and knowledge of other client devices, client requirements and the quality of connectivity experienced by clients can be utilized in the MANO decision making process.

The customized, situation-aware, user-driven NFV-MANO methods and systems described herein enable on-demand composition, configuration, and deployment of MANO system components, which can be deployed at and operated by (mobile) clients/tenants. The present disclosure describes MANO systems and methods that are aware of, and tailored to, management requirements unique to individual NS instances and that provide only essential functions/services demanded by particular situational requirements of a NS. Due to dynamic and tailored provisioning, the methods and systems described herein can provide for significant improvements in MANO operations for resource-constrained edge data centers.

In particular, the present disclosure describes methods and systems for making, based on clients' (e.g. UEs and verticals/tenants) demanded services and associated quality of service (QoS)/quality of experience (QoE) requirements, NFV-MANO decisions that both (i) best suit client/tenant service/operational requirements, and (ii) leverage the clients' situational and environmental awareness to make MANO decisions.

According to the present disclosure, a customized MANO stack can be derived by combining a selected set of orchestration functions from a common, standard NFV-MANO stack (Common MANO functions) with orchestration functions and features that are relevant to the customer service requirements (Custom MANO functions). A standard MANO stack offers a set of the bare minimum features/functions/services for an NFV-MANO system. In such a way, only necessary functions/features will be available that will reduce the system complexity and resource requirements. The selected Common MANO functions can be complemented by the Custom MANO functions to build tailored orchestration system components for deployment on one or multiple UEs or, e.g., on one or multiple drones.

Because not all information relevant for optimizing MANO decision making is available on the infrastructure premises, an entirely infrastructure-based MANO system may not be aware of the environmental situation (e.g. radio coverage and link quality, services used, demand for services/resources, mobility patterns and profiles, service quality experienced by UEs, latency experienced by UEs, UE density, common UE requirements, etc.), and therefore, may not take proper orchestration decisions. By contrast, the customized, situation-aware, user-driven NFV-MANO methods and systems described herein can leverage the requirements and situational awareness of clients and make them an integral part of the MANO decision making process.

The term "resources" as used in the present disclosure can include, in particular, NFVI resources such as compute, storage, and network resources. The term "network function" as used in the present disclosure can include, in particular, functions of a control plane or a data plane, e.g. a function of a data plane node, a 5G user plane function (UPF), or a 5G control plane function (session management function (SMF), policy control function (PCF), application function (AF), etc.). The term "service function" as used in the present disclosure can include, in particular, a function associated with an application or a value adding service being used by a client. The term "MANO functions" as used in the present disclosure can include, in particular, functional elements of a MANO system—e.g. functions for monitoring, data analytics, lifecycle management, scaling, etc. As used in the present disclosure, the term "MANO functions" can include customized functions for MANO. The term "client" as used in the present disclosure can include, in particular, UEs as well as vehicles (e.g. UAVs) and static objects such as sensors, lampposts, etc.

According to the present disclosure, methods are provided for building a customized MANO stack at/for one or more client devices. Building a customized MANO stack can include building a template according to orchestration requirements, building orchestration functions from a common MANO function repository and a customized MANO function repository, and installing tailored and/or customized MANO components on a client device and collaborating according to a deployment/operations model.

According to the present disclosure, methods of managing and orchestrating NFV resources are provided that rely on an NFV-MANO system that is distributed between the network infrastructure and client devices, e.g. UEs. In such systems, a plurality of UEs can be configured to execute an NFV-MANO client application. The NFV-MANO client application includes the functionality to make decisions concerning the management and orchestration of VFs, e.g. based on measurements of UE-specific Qos/QoE. When multiple UEs execute an NFV-MANO client application for making decisions concerning VFs/NFVI components that serve a cluster of UEs, the NFV-MANO client application can include consensus protocols that enable the multiple UEs to reach an agreement as to which MANO decisions are to be enforced. For example, if different UEs executing the NFV-MANO client application make MANO decisions concerning the same VFs/NFVI components and the decisions are in conflict with one another, a consensus protocol can be utilized in order to resolve the conflict.

For clusters of UEs that are served by the same VFs/NFVI components, a head client can be selected for the cluster. The process for selecting a head client for the cluster can be repeated in the event that a previously selected head client moves to a different client cluster. Clusters can be explicitly defined, e.g. based on a set of VFs, and UEs can be specifically assigned thereto. In implementations where a head client is selected for a cluster, the head client can be provided with the authority act as a representative for the cluster and to unilaterally make MANO decisions concerning, e.g., the set of VFs. As an alternative to such representative model (involving the selection of a head client), all UEs assigned to the cluster that execute the NFV-MANO client application (and therefore have the capability to make MANO decisions—deemed participating UEs) can be provided with equal MANO decision making authority. In such implementations, consensus/negotiation protocols (which can include, e.g., voting complemented with tiebreak rules) can be implemented such that a single set of MANO decisions can be agreed upon by the participating UEs. The agreed upon MANO decisions can then be reported, e.g. by a designated participating UE, to the network infrastructure for enforcement.

In a similar fashion, UEs executing NFV-MANO client application and assigned to different clusters can collaboratively make MANO decisions, e.g. for VFs/NFVI components that service the different clusters to which the collaborating UEs are assigned. In such implementations, the set of participating UEs assigned to different clusters can appoint a representative participating UE to make MANO decisions (e.g. particular inter-cluster MANO decisions) on their behalf. Alternatively, each participating UE in the set of participating UEs assigned to different clusters can be granted equal MANO decision-making authority and consensus/negotiation protocols can be executed to select the MANO decisions that will be enforced when such participating UEs individual make MANO decisions that conflict with MANO decisions made by other such participating UEs.

According to the present disclosure, methods of managing and orchestrating NFV resources are provided that make MANO decisions based on data acquired by a single or by multiple user devices, e.g. UEs, through collaborative data monitoring. Collaborative data monitoring can be carried out both by clients within a single client cluster (intracluster collaborative data monitoring) and by clients in different client clusters (intercluster collaborative data monitoring). MANO decisions can be made, as discussed above, collaboratively both by clients within a single client cluster and by clients in different client clusters.

According to the present disclosure, methods of managing and orchestrating NFV resources are provided that make MANO decisions concerning a variety of NFVI components. The network infrastructure can communicate to user devices (e.g. UEs) regarding the NFVI components that can be managed and orchestrated by the NFV-MANO client devices (e.g. UEs executing an NFV-MANO client application). Such communication from the network infrastructure (i.e. from the infrastructure-side NFV-MANO system, e.g. particular components thereof) can make UEs executing NFV-MANO client applications (collectively, the client-side NFV-MANO system) aware of which resources and services they are capable of managing and orchestrating. NFVI components that can be managed and orchestrated by the client-side NFV-MANO system can include, e.g., mobile NFVI resources (e.g. a UAV/vehicle/robot with on-board compute/network/storage resources) and VFs or physical NFs (e.g. a mobile radio base station (BS)) deployed at various NFVI components. For example, a client can enforce the placing of a NFVI resource (e.g. an avionic multi-access edge computing (MEC) environment), the placing of an NF (e.g. a radio base station (BS) function, a UPF, etc.), or the placing of a service function. For example, a client can enforce the placement of a UAV with on-board compute/network/storage resources on top of which network or service functions can be instantiated.

Clients can also collaborate to determine an optimal decision for placing or re-placing NFVI resources, network functions, and/or service functions. Similarly, clients can collaborate to orchestrate their own positioning respective to positioned and orchestrated NFVI resources, NFs, and service functions.

Client collaboration can take place in different ways. For example, in a first type of collaboration, each user device executing an NFV-MANO client application has equal rights in the MANO decision-making process. Alternatively, in a second type of collaboration, each cluster has a designated head client that collaborates with helper clients. The designated cluster head is responsible for communicating with the infrastructure-side MANO system. In addition, the designated cluster head may also communicate with other clusters representing its home cluster.

In the first type of collaboration, where clients within a cluster have equal orchestration rights, all have to collaborate towards convergence of orchestration decisions and of decisions regarding which client will enforce the orchestration decisions in the infrastructure. In the second type of collaboration, where a cluster head is designated, the other clients within the cluster (i.e. the helper clients) communicate environmental information as well as requirements towards the current cluster head, which then takes and enforces an orchestration decision. In the event that a designated cluster head moves to another cluster, e.g. due to mobility or re-arrangement of clusters, a new cluster head must be designated.

In the event of client mobility, clients within as well as beyond a cluster can collaborate on the re-computation of orchestration decisions. This includes changes in the placement of resources (e.g. moving a drone with compute resources and a cellular radio base station to a different position, instantiation of a service or network function on an additional resource to make it available to the client which moves into the new area—e.g. as defined by radio coverage of a different drone or a different cluster). The re-computation of orchestration decisions can also include migration of network or service functions between resources, or migration of session states between service or network functions which are deployed on multiple resources.

In order to make orchestration decisions, clients can exchange information on location, movement patterns/stats/anticipation, used services, resource demand/QoS, at the same time clients learn about resources, capability (movable/placeable etc.), and network level (flying, fixed edge cloud). Clients can also make decisions on resource placement and/or support NF placement. For example, drones with radio base stations can be placed to best connect to a resource higher up in a hierarchy, a resource for service functions can be placed at a common drone above the radio base station drones, or a resource for service functions ca be placed in the fixed infrastructure. Clients take decision on function placement and scale per resource.

A client/MANO cluster may be 1 . . . N per radio spot/UPF (drone case) or can span across multiple radio spots. Cluster building can be performed by clients either autonomously or in collaboration with the infrastructure. In a reactive approach, clients may move to another cluster (mobility), join the new cluster, and then influence orchestration decisions (e.g. instantiation of the required service in resources which better serve the new cluster, migration of states from service in a different resource, migration of service functions in cases where it serves only the moving client). In a proactive approach, clients may influence orchestration decisions before moving and while still being in the previous cluster. Furthermore, it is also possible for clients to make orchestration decisions that involve positioning cluster participants so as to provide the improved service. In other words, clients can drive the placement of clients into client clusters and the positioning of the cluster participants (client-driven client placement).

By leveraging the systems and methods described in the present disclosure, clients and the system can achieve the following advantages. First, orchestration decisions can be made in a direct and optimized manner. Since a single client or a group of collaborating clients can orchestrate, according to their view and demand, NFVI components, enforcement of orchestration decisions can (i) be carried out faster and (ii) be optimized from the point of view of the single client or group of collaborating clients.

Second, customized MANO functions can be installed at clients without allocating superfluous memory. Client resources (processing, storage, network, etc.) can be well utilized because the customized MANO functions solely focus on designated tasks. Designated tasks can include, for example, placement of mobile NFVI resources (e.g. a UAV with edge compute resources and a cellular base station for covering and serving a group of mobile clients), placement and instantiation of network functions and service functions on the placed mobile NFVI resources, and relocation of network or service function instances or session states between mobile NFVI resources can all be carried out to achieve a customized objective determined by the single client or group of clients.

Finally, since clients can place and use mobile NFVI resources (e.g. a UAV with edge compute resources and a cellular base station, a mobile machine-type device with compute resources, etc.) per their need, they can continuously monitor the environment (their own radio link and service quality, their own and other clients' movements) and enforce updated orchestration decisions, e.g. correction in the positioning of mobile NFVI resources, scaling or migration of network and/or service function instances on mobile and/or static NFVI resources, etc., in real time. Such operation enables optimized service provisioning as well as service continuity.

Systems and method described herein have a number of possible use cases. For example, systems and methods described herein can be utilized by drones with on-board cellular radio base stations and mobile edge computing (MEC) resources to provide local services in areas which temporarily require capacity and low latency services, e.g. emergency situations, infrastructure failures, etc. Infrastructure failures may require orchestration on the UE side per the mechanisms described herein to set up and maintain service to a group of UEs. As another example, systems and methods described herein can be utilized by distributed sensors or machine-type devices to position a mobile resource (e.g. a drone, a vehicle, etc.) so as to support coverage and use of local services. Such sensors or devices may recommend or enforce (in the case of autonomously driven devices) a policy for UE/client positioning to meet a certain task, e.g. surveillance or a defined region, collection of monitored data points, collaboration of robots in a factory.

Infrastructure with distributed data centers and edge compute resources may extend coverage, by the use of UAVs with on-board compute and storage resources as well as cellular radio base stations, of a fixed infrastructure. In particular, such a UAV can be used to cover a region below the UAV with cellular radio access to local resources as well as to the network infrastructure. For the latter, the UAV has a backend radio link to the infrastructure, e.g. based on LTE or directional digital radio links. The area which is served on the ground by the UAV's on-board radio base station depends on the UAV's distance from the ground as well as the UAV's geographic position.

According to embodiments of the present disclosure, one or more clients with customized MANO stacks may orchestrate the positioning of one or multiple UAVs to optimize coverage provided to the group. While moving, the one or more clients may agree on an updated position of the UAVs to optimize service continuity. In addition to the positioning of the one or multiple UAVs, the one or more clients can agree on one or multiple network or service functions that should be instantiated on the one or multiple UAVs instead of utilizing fixed network infrastructure resources for such instantiation. The advantage is that the network and service functions can be utilized closer to the clients and can offload traffic from the backend radio links connecting the one or multiple UAVs to the fixed network infrastructure. Redundancy can be leveraged by the instantiation of network and service function instances on multiple UAVs, e.g., to utilize load balancing and to continue serving a mobile client form a new instance on a neighbor drone in case the client moves into the radio coverage area of the respective neighbor drone. To agree on the orchestration decisions for initial deployment as well as for updated configurations, clients may have the same orchestration role or one client can serve as a cluster head in the decision or enforcement of orchestration decisions, taking other clients' preferences, service descriptions, requirements, and measurements into account. Clients' collaboration on custom orchestration tasks can be performed by any of the above described methods. Additional variants for collaboration are possible, e.g. by each client in a group of clients performing monitoring of the environment and taking one or multiple orchestration decisions, which are exchanged with other clients in the environment. The final orchestration decision is negotiated based on federated orchestration between clients.

Various options for the enforcement of clients' orchestration decisions exist, e.g. by clients directly accessing the virtualized infrastructure manager (VIM) in the infrastructure, which allocates infrastructure resources and utilizes a control system to position mobile resources on the UAVs. In case UAV resources host network functions of the 5G System, e.g. a 5G User Plane Function (UPF), the reference points between the (mobile) UPF of a UAV and the 5G Control Plane in the network infrastructure must be enabled and maintained (N4 reference point per the 5G architecture).

In another embodiment, systems and methods described herein can be leveraged by an industrial environment. Production robots or mobile machine-type devices serve as mobile clients and deploy customized orchestration functions to collaborate on the placement of mobile resources. The latter can be, for example, 5G new radio base stations, which provide high data rate and low latency wireless access to the mobile robots. The 5G radio base stations can be associated with UAVs or on a mounted track system on the ceiling of the factory building. The 5G radio base station can be positioned flexibly on the ceiling to service a group of robots. Multiple of such 5G radio base stations on the ceiling can exist to cover any possible spot on the ground of the factory building or area. The 5G radio base stations on the ceiling can be complemented by compute-, storage- and networking resources, e.g. for robots to place complementary network- or service functions on the resources for local-/edge computation and low latency connectivity between the robots and the network-/service function. As an example, such service function can be associated with the control of robots or production machinery.

In a further embodiment, systems and methods described herein can be leveraged by construction sites, where construction machines make use of local resources to meet low latency requirements with network- and service functions in the infrastructure. Local services can be associated with the control of construction machinery or local control agents, which complement a remote human controller of the construction machinery with local functions, e.g. for low latency sensor-actuator feedback between machinery and local functions instantiated and running at the local resources. Such local resources can comprise a 5G new radio base station to enable low latency radio connectivity to mobile construction machinery, as well as compute, storage, and network resources. Local resources can be on a dedicated mobile device, such as a UAV or a vehicle which can be positioned and used per the orchestration decisions of the construction machinery.

In yet another embodiment, systems and methods described herein can be leveraged for mission critical deployment and use of resources during an emergency situation by police, ambulance and/or fire fighters. One or multiple emergency vehicles leverage customized MANO functions to place, allocate and use resources for their mission critical task. As an example, network and service functions, which support connectivity to a remote medical team to aid the on-site care of injured patients while maintaining the required service levels, such as low-latency, bandwidth, video transcoding, electrocardiogram (ECG) data transmission, etc. Another use of client-orchestrated resources and services can be related to on-site low-latency services for the communication between emergency vehicles and personnel, e.g. during a mission critical commitment after a disaster event. This can include the provisioning of mobile resources, e.g. co-located with UAVs or ground vehicles, and orchestration of the positioning as well as use of these resources (network- and service function instantiation and lifecycle management). Instantiated functions can be, as example, a complete fallback (in case of disaster event impact) or dedicated mobile core network to enable cellular connectivity between rescue staff. In addition, applications, such as for audio-/video-communication, local storage or local computing of monitored/measured data (e.g. from sensors, cameras, microphones, radioactive radiation, seismometer, ECG, etc.).

According to an embodiment, a method is provided for performing NFV-MANO operations in a telecommunications network. The telecommunications network includes stationary infrastructure components and mobile infrastructure components that communicate with stationary infrastructure components via wireless links. The method includes collecting, by a mobile network node, mobile network node condition data that specifies network conditions present at the mobile network node, providing, to a distributed NFV-MANO system component located at the mobile network node, the mobile network node condition data, and executing, by the distributed NFV-MANO system component, MANO decision logic. The MANO decision logic provides, based on input that includes at least the mobile network node condition data, at least one MANO operation decision as output. The mobile network node is one of the mobile infrastructure components of the telecommunications network that communicate with the stationary infrastructure components of the telecommunications network via the wireless links.

The method can further include wirelessly transmitting, to an infrastructure-side NFV-MANO system component located at one or more of the stationary infrastructure components of the telecommunications network, an instruction to enforce the at least one MANO operation decision provided as output by the MANO decision logic.

The mobile network node condition data can include one or more of the following: a round trip time (RTT) between the mobile network node and one of the stationary infrastructure components or between the mobile network node and another mobile infrastructure component, the wireless link quality experienced by the mobile network node, variations in the wireless link quality due to mobility or obstacles in the line-of-sight between a wireless transmitter and receiver, local states at the mobile network node (e.g. battery status, load, or imminent changes in the association with a cluster), the experienced quality when using a service (which may be placed on a UAV's NFVI resource), or its location/position relative to other mobile network nodes or to the stationary infrastructure components. For example, the mobile network node condition data can include a channel quality (e.g. between the mobile network node and fixed wireless network infrastructure), a link quality (e.g. between the mobile network node and fixed wireless network infrastructure), an interference level (e.g. experienced by the mobile network node), a current battery level of the mobile network node, latency (e.g. experienced by the mobile network node), and computing resources available at the mobile network node.

The at least one MANO operation decision can be an FCAPS management decision and/or an LCM decision. The LCM decision can be a decision to perform at least one of scaling, migrating, instantiating, deleting, updating, upgrading, and configuring a VF instance deployed in an NFVI of the telecommunications network. The NFVI of the telecommunications network can be distributed between the stationary infrastructure components of the telecommunications network and the mobile infrastructure components of the telecommunications network that communicate with the stationary infrastructure components via wireless links. The mobile infrastructure components of the telecommunications network can include a UAV having compute, storage, and network resources that form a portion of the NFVI of the telecommunications network. The VF instance can be hosted by the compute, storage, and network resources of the UAV.

In an implementation of the method, the mobile network node is a UE, the mobile infrastructure components of the telecommunications network include a UAV, and the at least one MANO operation decision provided as output by the MANO decision logic is a decision to move the UAV to a geographic location.

In another implementation of the method, the mobile network node is a UE, the mobile infrastructure components of the telecommunications network include a UAV, the UAV includes compute, storage, and network resources that form a portion of an NFVI of the telecommunications network, the UAV hosts one or more VFs, and the at least one MANO operation decision provided as output by the MANO decision logic is a decision to perform an LCM operation and/or an FCAPS management operation on the one or more VFs hosted by the UAV.

In another implementation of the method, the mobile network node is an UAV that includes compute, storage, and network resources that form a portion of an NFVI of the telecommunications network, and the at least one MANO operation decision provided as output by the MANO decision logic is a decision to move the UAV to a geographic location and/or a decision to perform an LCM operation and/or an FCAPS management operation on one or more virtual functions hosted by the UAV.

The method can further include installing the MANO decision logic at the mobile network node, wherein the MANO decision logic is provided by a custom MANO stack deployed on the distributed NFV-MANO system component located at the mobile network node. The custom MANO stack can include a combination of one or more common MANO functions and one or more custom MANO functions. The one or more common MANO functions and the one or more custom MANO functions are downloaded by the mobile network node from a custom MANO function repository and a common MANO function repository, respectively, hosted by the stationary infrastructure components of the telecommunications network.

According to an embodiment, a system is provided for performing NFV-MANO operations in a telecommunications network. The telecommunications network includes stationary infrastructure components and mobile infrastructure components that communicate with stationary infrastructure components via wireless links. The system includes one or more processors located at a mobile network node which, alone or in combination, are configured to collect mobile network node condition data that specifies network conditions present at the mobile network node, and execute MANO decision logic. The MANO decision logic provides, based on input that includes at least the mobile network node condition data, at least one MANO operation decision as output. The mobile network node is one of the mobile infrastructure components of the telecommunications network that communicates with the stationary infrastructure components of the telecommunications network via the wireless links.

According to an embodiment, a tangible, non-transitory computer-readable medium having instructions thereon which, upon being executed by one or more processors, alone or in combination, provide for execution of a method comprising collecting mobile network node condition data that specifies network conditions present at a mobile network node and providing the mobile network node condition data to a distributed NFV-MANO system component located at the mobile network node. The method further includes executing MANO decision logic. The MANO decision logic provides, based on input that includes at least the mobile network node condition data, at least one MANO operation decision as output. The mobile network node is one of the mobile infrastructure components of the telecommunications network that communicate with the stationary infrastructure components of the telecommunications network via the wireless links. Various aspects of NFV-MANO methods and systems contemplated by the present disclosure and/or certain implementations thereof are explained in further detail in the figures and the following description of said figures.

Figure 2:
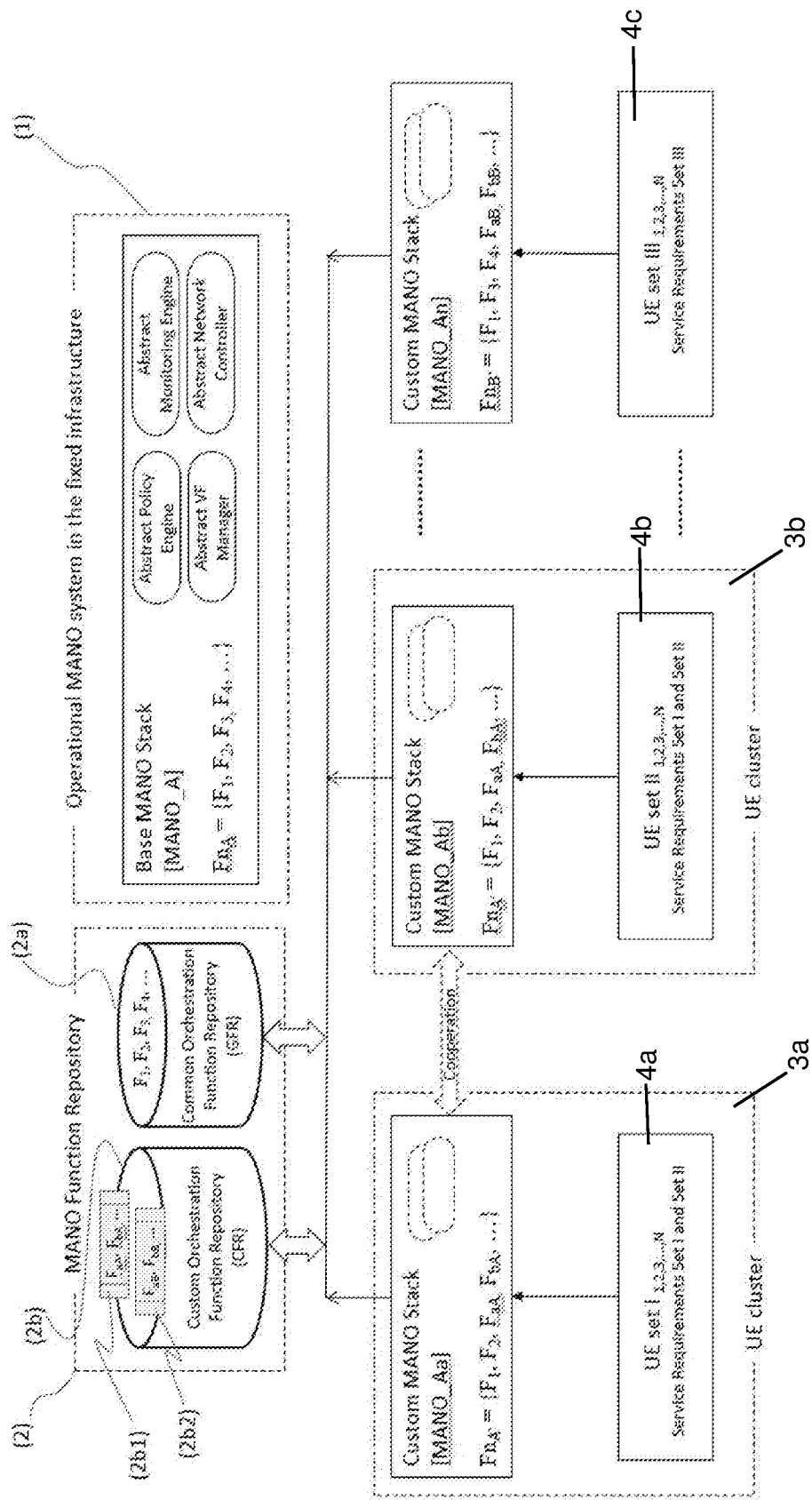
FIG. 2 depicts an NFV-MANO system architecture.

FIG. 2 illustrates a hierarchical NFV-MANO system where a custom NFV-MANO component is built from components of (i) a standard, base NFV-MANO system that includes a set of functions of a common NFV-MANO stack, and (ii) a set of custom NFV-MANO functions, which provide particular MANO features, e.g. associated with client monitoring, environmental discovery, orchestration, and lifecycle decisions.

In FIG. 2, MANO functions are provided by MANO Function Repository 2, which provides common orchestration functions in Common Orchestration Function Repository 2a, and which further provides custom orchestration functions in Custom Orchestration Function Repository 2b. The Custom Orchestration Function Repository 2b may manage and provide custom MANO functions from different custom groups or providers in a shared or isolated space. In the latter case (where custom MANO functions are provided in an isolated or private repository), access to a particular set of custom MANO functions, such as the set of MANO functions 2b1 or the set of MANO functions 2b2, may be granted solely to authenticated and/or authorized clients. Another implementation for isolation of custom MANO functions is provisioning through separate repositories.

NFV-MANO systems and methods described herein can utilize the concept of inheritance in object-oriented (OOP) programming, which is a mechanism where a class inherits the features (fields and methods) of another class. In the case of a custom orchestration function for NFV-MANO (a custom NFV-MANO function, e.g. such as is provided in Custom Orchestration Function Repository 2b), a new orchestration solution can be derived from a base NFV-MANO function derived from a template by complementing the features of the base NFV-MANO function to satisfy new orchestration challenges.

The MANO functions provided by the MANO Function Repository 2 can be implemented as micro services (micro MANO functions) and the customized or tailored MANO stack can be composed of a group of networked micro services. The term "micro service" in this context can refer to functionalities designed and implemented using the modern micro service based architecture in which complex solutions or services are broken down into logically independent micro services. In this manner, a complete MANO function can be split into smaller micro services that interact with each other to form the complete MANO function. In other words, a MANO function can be composed of a plurality of individual micro services (which, in the context of MANO functions, can also be referred to as individual micro MANO functions). In the same manner, a custom MANO stack can be can be composed of a plurality of individual MANO functions—i.e. the MANO functions provided by the MANO Function Repository 2—selected as needed to build a full MANO stack with certain desired capabilities and characteristics.

In an NFV-MANO system that is distributed between the network infrastructure and client devices, e.g. UEs, the portion of the NFV-MANO system residing at the client devices can be referred to as the client-side NFV-MANO system. The client-side NFV-MANO system includes NFV-MANO client applications that provide customizable MANO function stacks. Customized MANO function stacks can be built at each individual client/user device (e.g. UE) from available, off-the-shelf sets of common MANO functions (e.g. those provided in Common Orchestration Function Repository 2a) and then complementing their respective functional scope, e.g. with previously developed custom MANO functions (e.g. those provided in Custom Orchestration Function Repository 2b) or with newly developed custom MANO functions (e.g. based on a previously developed custom MANO function or a MANO function template). An appropriate template for developing a custom MANO function can be selected according to orchestration requirements including, e.g., service placement, scaling, and resource placement (drone, avionic MEC). This approach can enable clients to collaborate—both within a single cluster and among multiple different clusters—to agree on the best orchestration solution (e.g. in the form of a custom MANO stack) for their current demands. Templates for a custom MANO function can be provided, e.g., in the form of a yet another markup language (YAML) or a yet another next generation (YANG) template.

FIG. 2 depicts an NFV-MANO system architecture. In the hierarchical NFV-MANO system depicted in FIG. 2, the fixed infrastructure deploys an operational MANO system 1, i.e. an infrastructure-side NFV-MANO system. The customized MANO stacks operating on the clients, such as UEs, complement the MANO system 1. By way of example, FIG. 2 illustrates UE clusters 3a and 3b including sets of UEs (i.e. UE set I 4a and UE set II 4b) having common requirements and orchestration needs that cooperate in deploying a customized MANO stack (FnA'), comprising common (F1, F2) and customized (FaA, FbA) MANO functions. An additional set of UEs (i.e. UE set III 4c) with different requirements and orchestration needs comprises a different combination of common (F1, F3, F4) and customized (FaB, FbB) MANO functions. UEs from set I and set II may split into different clusters and agree, within a cluster, upon a combination of common and customized MANO functions for use in deploying a customized MANO stack. Custom MANO stacks can also be constructed at a mobile edge node of the network infrastructure, e.g. at a UAV having transceiver antennas and configured to act as a mobile BS.

The common MANO functions provided by the common orchestration function repository 2a can include, e.g., VF instance status (e.g. load, failure, etc.) monitoring, VF scaling, migration or replication decision-making, and heartbeat functions for checking the reachability/availability of MANO peers. The custom MANO functions provided by the custom orchestration function repository 2b can include, e.g., monitoring and evaluation of a Key Performance Index (KPI) associated with mobile resources, placement and orchestration of mobile resources, collaboration with other custom MANO stacks associated with other mobile network nodes in the proximity (same or different cluster).

In FIG. 2, and as elsewhere described in the present disclosure, the mobile network node can be, e.g., a physical machine including compute resources, storage resources, and network resources. The compute resources can include, e.g., one or more processors each having one or more processor cores. The storage resources can include, e.g., computer readable memory, e.g., random-access-memory (RAM) and/or cache memory. The network resources can include, e.g., a physical network interface controller (NIC). Such a physical machine can additionally include a bus that couples various system components, e.g. the processors and the computer readable memory, together. The network interface controller enables it to interface with other components. In addition, such a physical machine can host one or more virtual machines (VMs) and/or one or more containers. Each VM and/or container can be, e.g., an isolated environment that occupies a share of the compute, storage, and network resources of the physical machine. In other words, the physical machine hosts isolated environments that utilize the compute resources, storage resources, and network resources thereof.

Figure 3:
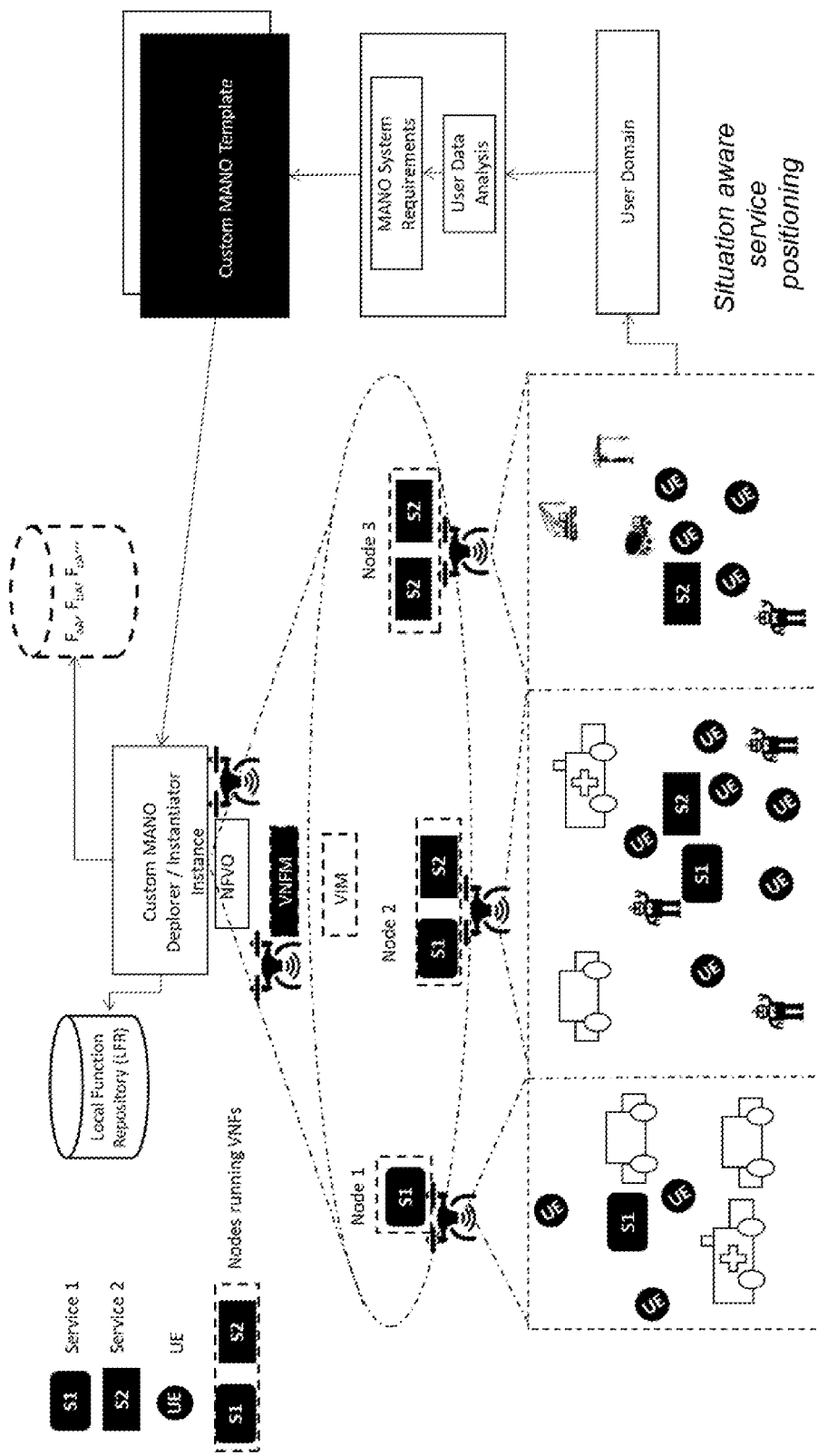
FIG. 3 illustrates situation-aware service provisioning in an NFV-MANO architecture.

FIG. 3 illustrates situation-aware service provisioning in an NFV-MANO architecture. In the situation-aware service provisioning illustrated in FIG. 3, a user-data analytics framework is used to predict the orchestration needs and to build, based on collected user domain information (e.g. Quality of Experience, Quality of Service, number of users, etc.), custom MANO stacks by using a custom MANO template. Based on the custom MANO template (which can be expressed, e.g., as a YAML/YANG template or a template based on any other form of template representation language) custom MANO stacks can be constructed and then deployed for execution by individual clients, e.g. UEs. As an alternative to the construction of custom MANO stacks by a user-data analytics framework, individual clients and/or network tenants can construct custom MANO stacks for execution at one or more user devices by manual editing or compilation.

Figure 4:
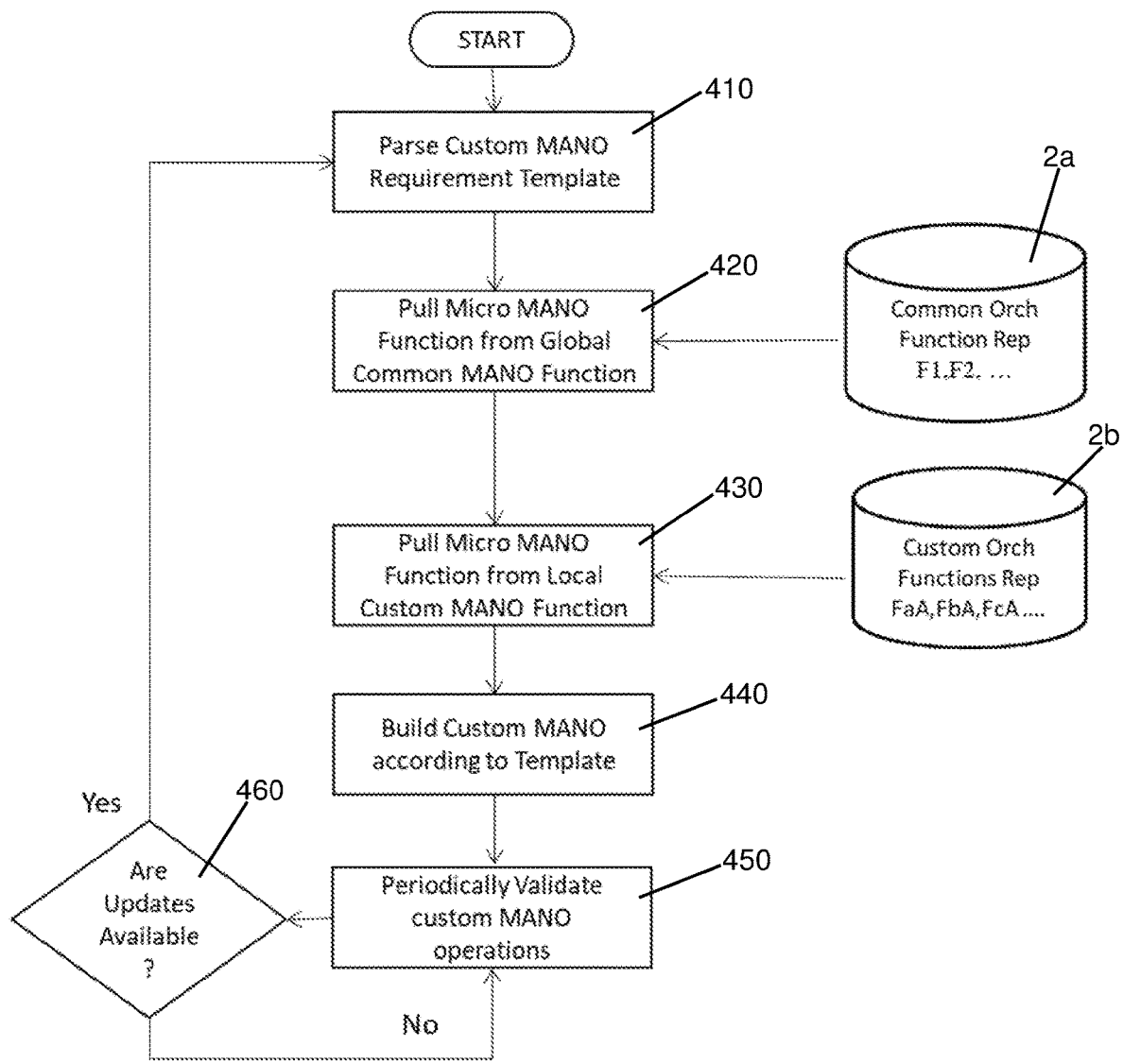
FIG. 4 illustrates a process of building a custom MANO platform on demand.

FIG. 4 illustrates a process of building a custom MANO stack in an on demand fashion according to an embodiment of the invention. Such a custom MANO stack can be provided via an NFV-MANO client application configured to be executed at a user device, e.g. a UE. Such a custom MANO stack could also be provided at a mobile edge node of the network infrastructure, e.g. a UAV having transceiver antennas and configured to act as a mobile BS. The process illustrated in FIG. 4 can be executed, e.g., by a user device such as a UE, by a user-data analytics framework (such as can be implemented in an infrastructure-side NFV-MANO system), by a tenant, by the infrastructure side NFV-MANO system on behalf of a particular tenant, etc.

At 410, the process starts by parsing a custom MANO requirement template. The custom MANO requirement template can, according to one or more implementations of the process illustrated in FIG. 4, identify a set of NFVI components (e.g. one or more UAVs including compute, storage, and network resources) that can be managed as well as types of VFs that can be deployed in the NFVI and be managed. The custom MANO template can be in a public or private repository (anywhere accessible), and parsing the template provides the necessary information required to construct a custom MANO. The template can be, e.g., a list of common and custom requirements of MANO functions and can be updated as requirements of the UE/mobile network node/UE domain change. The template can include, e.g., identifiers that identify one or more common functions, e.g., heartbeat functions, monitoring functions, etc. as well as specific virtual functions for a user domain.

Thereafter, the process builds a custom MANO stack for a client in an on demand fashion pursuant to the custom MANO requirement template parsed at 410. The custom MANO stack is constructed from MANO functions provided by an MANO function repository (e.g. the MANO Function Repository 2 of FIG. 2, described above) that can include, e.g., a common orchestration function repository and a custom orchestration function repository (e.g. the Common Orchestration Function Repository 2a and the Custom Orchestration Function Repository 2b, respectively, of FIG. 2, described above). Specifically, at 420, the process pulls a set of one or more micro MANO functions from a global common MANO function repository, e.g. the Common Orchestration Function Repository 2a, and at 430, the process pulls a set of one or more micro MANO functions from a local custom MANO function repository. In addition, at 440, the process builds additional custom MANO functions using, e.g., a custom MANO function template (provided, e.g., as a YAML or YANG template) or a preexisting MANO function provided by the local custom MANO function repository.

When constructing the custom MANO stack, only micro MANO functions which are needed for MANO tasks that will be performed on the clients' end are retrieved to build the custom MANO stack. The determination of which micro MANO functions are needed for MANO tasks that will be performed on the clients' end can be determine, e.g., from the parsing of the custom MANO requirement template at 410. Such functions can, e.g., have specific identifiers by which they can be identified and can be realized as VNFs or containers. In this manner, the overhead required for deployment of the custom MANO stack on one or multiple clients can be kept to a minimum. In particular for micro MANO functions pulled from the custom MANO repository, any semantic in the orchestration decision and template being communicated to the infrastructure for enforcement is correctly interpreted by the network infrastructure (e.g. the infrastructure VIM or MANO system). For example if the custom MANO stack can place mobile resources e.g. avionic MEC, and the network announces the capability for a custom MANO stack to take such orchestration decisions, enabling custom and common micro MANO functions are added to the template. Enforcement of orchestration decisions associated with such placement decisions must be interpreted and implemented accordingly.

At 450, the process performs a periodic validation of the custom MANO operations of the custom MANO stack that is constructed in 420 through 440, and at 460, the process determines whether any updates to the MANO infrastructure are available. If no updates are available, the process returns to 450. If updates are available, the process returns to 410.

Figure 5:
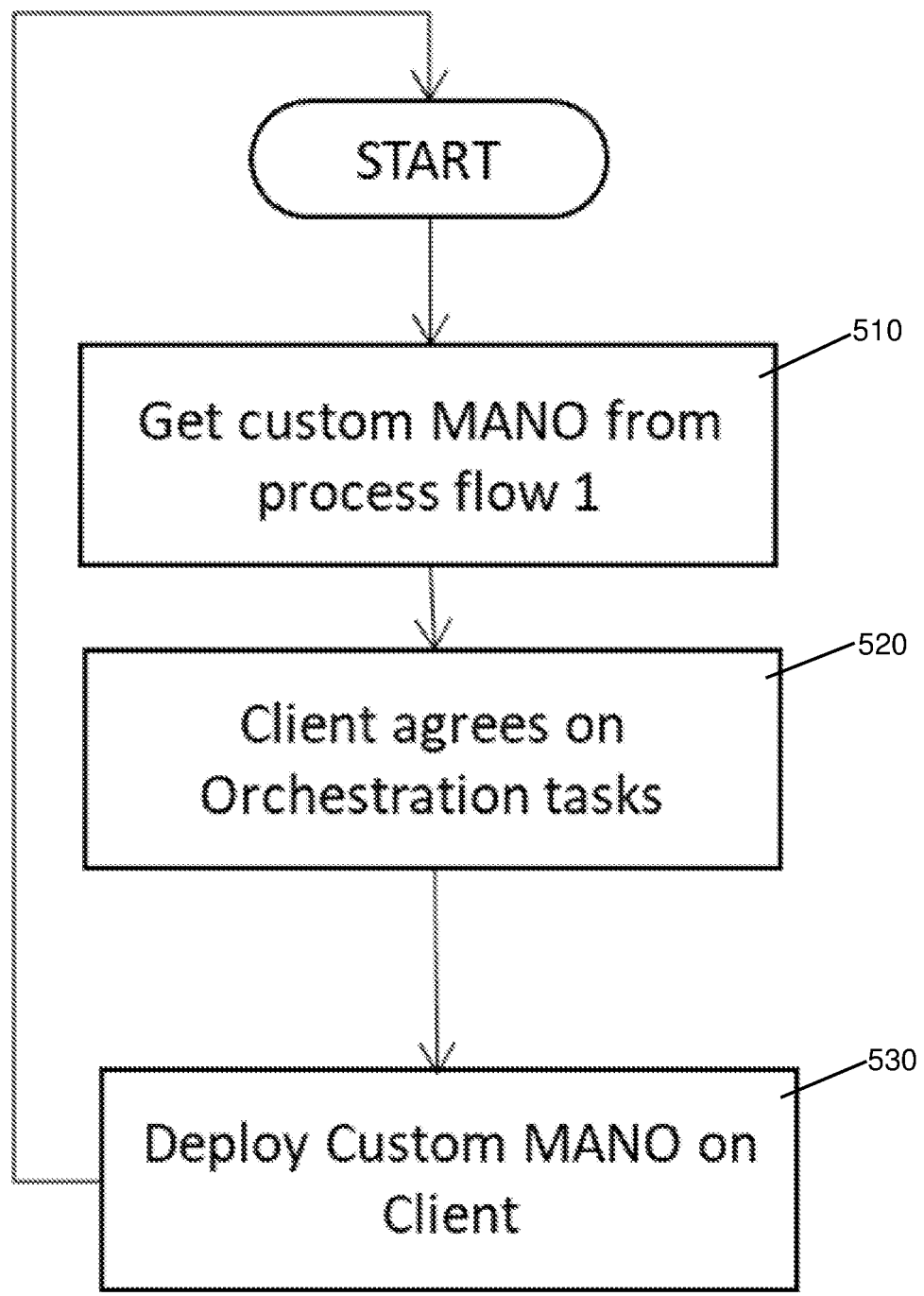
FIG. 5 shows a process of deploying custom MANO on a client based on agreed tasks.

FIG. 5 shows the process of deploying a custom MANO stack at a client. At 510, the process builds a custom MANO stack, e.g. using the process illustrated in FIG. 4. At 520, the client agrees on orchestration tasks. At 530, the custom MANO stack is deployed at the client.

Figure 6:
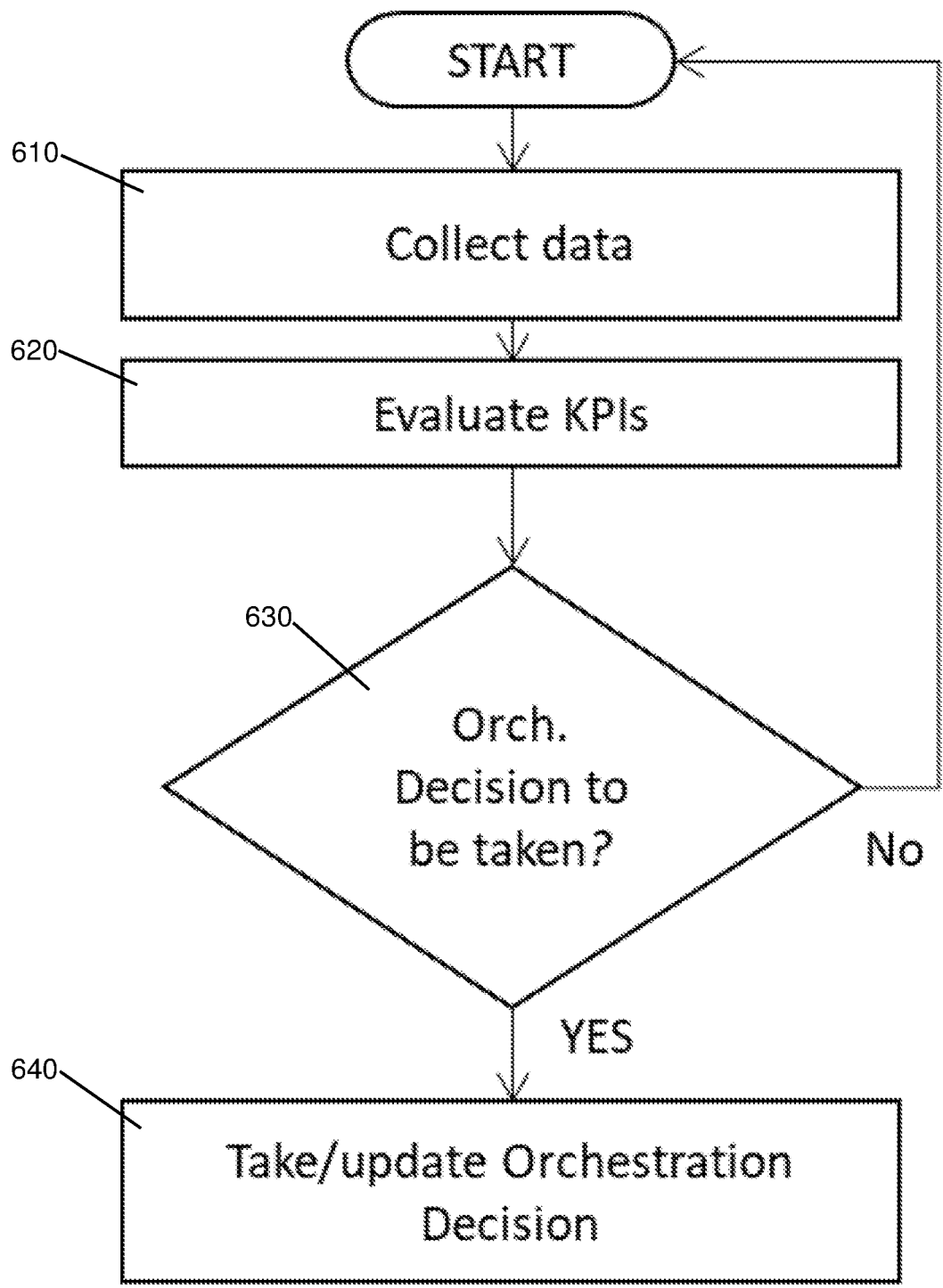
FIG. 6 shows a process of orchestration execution flow of custom MANO.

FIG. 6 shows the process of orchestration execution flow of custom MANO. The details of the orchestration tasks can be anything from placement of resources and on-demand instantiation of network functions and services to any kind of operation that an NFV-MANO system can execute. At 610, a mobile network node performs a data collection process. The data collection process can include, e.g., collecting mobile network node condition data that specifies network conditions present at the mobile network node. The network conditions present at the mobile network node can include, e.g., a channel quality (e.g. between the mobile network node and fixed or mobile wireless network infrastructure), a link quality (e.g. between the mobile network node and fixed or mobile wireless network infrastructure), an interference level (e.g. experienced by the mobile network node), a current battery level of the mobile network node, latency (e.g. experienced by the mobile network node), and computing resources available at the mobile network node. At 620, key performance indicators (KPIs) are evaluated, e.g. based on the data collected at 610. At 630, the process determines whether one or more orchestration decisions are to be taken. In determining whether orchestration decisions are to be taken, the data collected at 610 and/or the KPIs evaluated at 620 is/are provided to a distributed NFV-MANO system component located at the mobile network node. The distributed NFV-MANO system component then executes MANO decision logic, wherein the MANO decision logic provides, as output, one or more MANO operation decisions (i.e. orchestration decisions) or an indication that no orchestration decision is to be taken. If the MANO decision logic indicates, at 630, that no orchestration decision is to be taken, then the process returns to 610. If instead, the MANO decision logic provides as output, at 630, one or more MANO operation decisions, then the process proceeds to 640 where the one or more MANO operation decisions are taken/the NFV-MANO system is updated.

The methods and systems for customized, situation-aware, user-driven NFV-MANO disclosed herein can provide a number of advantages. In particular, methods and systems for NFV-MANO disclosed herein enable better orchestration decisions, which result in better experiences and service quality, by making UEs and mobile devices become active participant(s) in the MANO decision-making process. The custom MANO stacks built pursuant to and utilized by methods and systems for NFV-MANO disclosed herein additionally provide for the benefit of being able to be deployed at UEs, mobile devices, or mobile NFVI components (e.g. a UAV providing compute, storage, and network resources). Furthermore, methods and systems for NFV-MANO disclosed herein can make improved MANO decisions by leveraging a single mobile device's or a group of mobile devices' knowledge of their own environment (e.g. other devices in the proximity, radio link situation, QoS/QoE, etc.) to optimize placement and configuration of network resources, service instance(s), and network- and radio functions. Such knowledge of the network environment at the network infrastructure edge enables the mobile device(s) to make MANO decisions that provide a best match for service demands of the single mobile device or group of mobile devices.

The methods and systems for customized, situation-aware, user-driven NFV-MANO disclosed herein leverage client features and awareness to improve MANO decision-making. According to the methods and systems disclosed herein, clients can flexibly collaborate in making and enforcing MANO decisions with or without involvement of the infrastructure-side MANO system. In the event of infrastructure-side MANO system outage, e.g. due to failures, this represents a significant benefit as compared to methods and system that require the involvement of infrastructure-side MANO. According to the methods and systems disclosed herein, clients can make and enforce MANO decisions involving the positioning of mobile NFVI resources, e.g. a flying radio base station hosted by a UAV, the positioning of client devices themselves, and the locations of VFs at different NFVI components. Such MANO decisions can help to achieve improved deployment and runtime management of services, e.g., mission critical services with or without reduced infrastructure availability.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for performing network function virtualization (NFV) management and orchestration (MANO) operations in a telecommunications network, wherein the telecommunications network includes stationary infrastructure components and mobile infrastructure components that communicate with stationary infrastructure components via wireless links, the method comprising:
   collecting, by a mobile network node, mobile network node condition data that specifies network conditions present at the mobile network node;
   providing, to a distributed NFV-MANO system component located at the mobile network node, the mobile network node condition data; and
   executing, by the distributed NFV-MANO system component, MANO decision logic, wherein the MANO decision logic provides, based on input that includes at least the mobile network node condition data, at least one MANO operation decision as output,
   wherein the mobile network node is one of the mobile infrastructure components of the telecommunications network that communicate with the stationary infrastructure components of the telecommunications network via the wireless links.

2. The method according to claim 1, further comprising wirelessly transmitting, by the mobile network node to an infrastructure-side NFV-MANO system component located at one or more of the stationary infrastructure components of the telecommunications network, an instruction to enforce the at least one MANO operation decision provided as output by the MANO decision logic.

3. The method according to claim 1, wherein the mobile network node condition data includes one or more of the following: a round trip time (RTT) between the mobile network node and one of the stationary infrastructure components or between the mobile network node and another mobile infrastructure component, a channel quality, a link quality, an interference level, a current battery level of the mobile network node, latency, and computing resources available at the mobile network node.

4. The method according to claim 1, wherein the at least one MANO operation decision is a fault, configuration, accounting, performance, and security (FCAPS) management decision and/or a lifecycle management (LCM) decision.

5. The method according to claim 4, wherein the at least one MANO operation decision is an LCM decision, the LCM decision being a decision to perform at least one of scaling, migrating, instantiating, deleting, updating, upgrading, and configuring a virtual function (VF) instance deployed in a network function virtualization infrastructure (NFVI) of the telecommunications network.

6. The method according to claim 5, wherein the NFVI of the telecommunications network is distributed between the stationary infrastructure components of the telecommunications network and the mobile infrastructure components of the telecommunications network that communicate with the stationary infrastructure components via wireless links.

7. The method according to claim 6, wherein the mobile infrastructure components of the telecommunications network include an unmanned aerial vehicle (UAV), the UAV including compute, storage, and network resources that form a portion of the NFVI of the telecommunications network, and
   wherein the VF instance is hosted by the compute, storage, and network resources of the UAV.

8. The method according to claim 1, wherein the mobile network node is a user equipment (UE),
   wherein the mobile infrastructure components of the telecommunications network include an unmanned aerial vehicle (UAV), and
   wherein the at least one MANO operation decision provided as output by the MANO decision logic is a decision to move the UAV to a geographic location.

9. The method according to claim 1, wherein the mobile network node is a user equipment (UE), wherein the mobile infrastructure components of the telecommunications network include an unmanned aerial vehicle (UAV), wherein the UAV includes compute, storage, and network resources that form a portion of a network function virtualization infrastructure (NFVI) of the telecommunications network, wherein the UAV hosts one or more virtual functions (VFs), and wherein the at least one MANO operation decision provided as output by the MANO decision logic is a decision to perform a lifecycle management (LCM) operation and/or a fault, configuration, accounting, performance, and security (FCAPS) management operation on the one or more VFs hosted by the UAV.

10. The method according to claim 1, wherein the mobile network node is an unmanned aerial vehicle (UAV) that includes compute, storage, and network resources that form a portion of a network function virtualization infrastructure (NFVI) of the telecommunications network, and wherein the at least one MANO operation decision provided as output by the MANO decision logic is a decision to move the UAV to a geographic location and/or a decision to perform a lifecycle management (LCM) operation and/or a fault, configuration, accounting, performance, and security (FCAPS) management operation on one or more virtual functions hosted by the UAV.

11. The method according to claim 1, further comprising installing the MANO decision logic at the mobile network node, wherein the MANO decision logic is provided by a custom MANO stack deployed on the distributed NFV-MANO system component located at the mobile network node.

12. The method according to claim 11, wherein the custom MANO stack includes a combination of one or more common MANO functions and one or more custom MANO functions.

13. The method according to claim 12, wherein the one or more common MANO functions and the one or more custom MANO functions are downloaded by the mobile network node from a custom MANO function repository and a common MANO function repository, respectively, hosted by the stationary infrastructure components of the telecommunications network.

14. A system for performing network function virtualization (NFV) management and orchestration (MANO) operations in a telecommunications network, wherein the telecommunications network includes stationary infrastructure components and mobile infrastructure components that communicate with stationary infrastructure components via wireless links, the system comprising:

one or more processors located at a mobile network node which, alone or in combination, are configured to:
collect mobile network node condition data that specifies network conditions present at the mobile network node, and
execute MANO decision logic, wherein the MANO decision logic provides, based on input that includes at least the mobile network node condition data, at least one MANO operation decision as output, wherein the mobile network node is one of the mobile infrastructure components of the telecommunications network that communicate with the stationary infrastructure components of the telecommunications network via the wireless links.

15. A tangible, non-transitory computer-readable medium having instructions thereon which, upon being executed by one or more processors, alone or in combination, provide for execution of a method comprising:

collecting mobile network node condition data that specifies network conditions present at a mobile network node;

providing the mobile network node condition data to a distributed NFV-MANO system component located at the mobile network node; and executing MANO decision logic, wherein the MANO decision logic provides, based on input that includes at least the mobile network node condition data, at least one MANO operation decision as output, wherein the mobile network node is a mobile infrastructure component of a telecommunications network, wherein the telecommunications network includes stationary infrastructure components and mobile infrastructure components that communicate with the stationary infrastructure components of the telecommunications network via wireless links.

16. The method according to claim 1, further comprising wirelessly transmitting, by the mobile network node to an infrastructure-side NFV-MANO system component located at one or more of the stationary infrastructure components of the telecommunications network, an instruction to enforce the at least one MANO operation decision provided as output by the MANO decision logic, wherein the at least one MANO operation decision is a fault, configuration, accounting, performance, and security (FCAPS) management decision and/or a lifecycle management (LCM) decision, and wherein the mobile network nodes is a user equipment (UE).

17. The method according to claim 16, wherein the at least one MANO operation decision is an LCM decision, the LCM decision being a decision to perform at least one of scaling, migrating, instantiating, deleting, updating, upgrading, and configuring a virtual function (VF) instance deployed in a network function virtualization infrastructure (NFVI) of the telecommunications network.

18. The method according to claim 17, wherein the NFVI of the telecommunications network is distributed between the stationary infrastructure components of the telecommunications network and the mobile infrastructure components of the telecommunications network that communicate with the stationary infrastructure components via wireless links.

19. The method according to claim 18, wherein the mobile infrastructure components of the telecommunications network include an unmanned aerial vehicle (UAV), the UAV including compute, storage, and network resources that form a portion of the NFVI of the telecommunications network, and wherein the VF instance is hosted by the compute, storage, and network resources of the UAV.

20. The method according to claim 19, wherein the at least one MANO operation decision provided as output by the MANO decision logic includes a decision to move the UAV to a geographic location.

* * * * *